(12) United States Patent
Wang (10) Patent No.: US 7,055,547 B2
(45) Date of Patent: Jun. 6, 2006

(54) CIRCUIT BALANCING VALVE

(75) Inventor: Baogang Wang, Toronto (CA)

(73) Assignee: S.A. Armstrong Limited, Toronto (CA)

( * ) Notice: Subject to any disclaimer, the term of this patent is extended or adjusted under 35 U.S.C. 154(b) by 385 days.

(21) Appl. No.: 10/603,735

(22) Filed: Jun. 26, 2003

(65) Prior Publication Data

US 2004/0261862 A1    Dec. 30, 2004

(51) Int. Cl.
*F16K 37/00*    (2006.01)

(52) U.S. Cl. ............... 137/552; 137/557; 251/118; 251/367

(58) Field of Classification Search ............... 251/118, 251/367; 137/552, 557
See application file for complete search history.

(56) References Cited

U.S. PATENT DOCUMENTS

| | | | | |
|---|---|---|---|---|
| 4,419 A | * | 3/1846 | Clarke | 251/100 |
| 1,521,765 A | * | 1/1925 | Guerrant | 137/505.43 |
| 1,547,962 A | * | 7/1925 | Seewer | 239/482 |
| 2,064,795 A | * | 12/1936 | Gerdts | 137/552 |
| 2,621,015 A | * | 12/1952 | MacGregor | 251/50 |
| 2,770,252 A | * | 11/1956 | Bass, Sr. | 137/505.12 |
| 2,852,237 A | * | 9/1958 | Rees | 366/160.1 |
| 5,303,733 A | * | 4/1994 | Nelson | 137/505.38 |

OTHER PUBLICATIONS

Armstrong Pumps, Inc.-CBV Brochure, Crane Limited, Webpage page www.cranefs.com/ASP/ProdCelltem.asp?, Product Code= 11495&Whereclause=+WH, PN25 Bronze Balancing Valve, pp. 1-8, Sep. 1, 1999.*

Armstrong Pumps, Inc. —CBV Brochure, Sep. 1, 1999 (pp. 1-8).*

Crane Limited—website page www.cranefs.com/ASP/ProdCalterm.asp? Product Code+ 11495 & Whereclause=+WH, PN25 Bronze Balancing Valve, 2 pages.*

* cited by examiner

*Primary Examiner*—A. Michael Chambers (57) ABSTRACT

A circuit balancing valve includes a valve body having fluid flow passage extending therethrough. The fluid flow passage includes a fluid inlet passage-side in fluid communication with a supply line, and a fluid flow outlet passage-side in fluid communication with an outfeed line. A valve seat is provided in the valve body between the inlet and outlet flow passages, and a sealing member is selectively movable in the operation of the valve towards or away from the valve seat to restrict or permit fluid to flow from the inlet passage-side to the outlet passage-side. Fin members are disposed in the outlet passage. The fin members are provided as an axially elongated rib, with a radial spacing from each other of between about 45° and 135°. The inlet flow passage includes an enlarged diameter cylindrical section and a reduced diameter cylindrical section. A frustoconically shaped section disposed between the enlarged and reduced diameter sections, is characterized by a sidewall which tapers inwardly in a downstream direction. A respective pressure measuring probe is provided in communication with each cylindrical section to permit a measurement of the fluid pressures therein.

23 Claims, 7 Drawing Sheets

CIRCUIT BALANCING VALVE

SCOPE OF THE INVENTION

The present invention relates to a fluid circuit balancing valve, and more particularly a circuit balancing valve which permits accurate measurement and adjustment of fluid flow through the valve body to enable precision balancing and adjustment of fluid flow in fluid circulation and supply systems.

BACKGROUND OF THE INVENTION

Circuit balancing valves used to adjust water flow in water circulation and supply systems are well known. A typical valve construction includes a valve body which defines flow passage therethrough having an inlet flow side and an outlet flow side, and which further includes a sealing member which may be selectively moved towards or away from a valve seat to permit or restrict fluid flow from the inlet passage side to the outlet passage side. Pressure valves in communication with each of the inlet and outlet flow sides of the valve body are used to meter fluid pressures across the valve seat to determine any drop in fluid flow rates through the valve. Depending on the drop in fluid flow rates, the sealing member is moved to open or close the valve, to regulate fluid flow in the water circulation system.

Prior art circuit balancing valves suffer the disadvantage in that as the water flows through the flow passage, eddy currents may form whereby water tends to flow in a direction about the flow passage sidewall and transverse to the direction of primary fluid flow. Eddy currents within the flow passage may in turn disrupt laminar fluid flow through the valve, adversely affecting the measurement of fluid pressures within the flow passage and providing inaccurate flow readings.

SUMMARY OF THE INVENTION

The present invention seeks to overcome the disadvantages of prior art balancing valves by providing a circuit balancing valve for water and other fluid supply and/or circulation systems in which the valve body defines a fluid flow passage therethrough, and wherein one or more fin members are provided within the fluid flow passage to minimize circular or eddy flows about the flow passage sidewall.

Another object of the invention is to provide a circuit balancing valve which provides increased accuracy in the measurement of fluid flow.

Another object of the invention is to provide a circuit balancing valve for use in water or fluid supply and/or circulation systems, and which has a compact design so as to enable its installation and use in physically confined spaces.

A further object of the invention is to provide a circuit balancing valve which may be inexpensively and accurately manufactured.

To at least partially achieve some of the aforementioned objects, the balancing valve includes a valve body which has a water or other fluid flow passage extending therethrough. The fluid flow passage includes a fluid inlet passage-side which is in fluid communication with a fluid infeed supply line, and a fluid flow outlet passage-side which is in fluid communication with a fluid outfeed line or outlet. A valve seat is provided in the valve body between the inlet and outlet flow passages. The valve further includes a sealing member which is selectively movable in the operation of the valve either manually or electrically towards or away from the valve seat to restrict or permit fluid to flow past the valve seat from the inlet passage-side to the outlet passage-side and into the outfeed line or outlet. Preferably, the sealing member is disposed on a valve stem which is selectively movable relative to the valve body to move the sealing member towards or away from engaging contact with the valve seat.

Most preferably, the fluid flow passage extends as a passage which is elongated along an axis through the valve body, with each of the inlet and outlet passages being substantially defined by a respective sidewall which extends radially and concentrically about a central axis. One or more fin members are disposed in the outlet passage and project partway towards the axis from a position adjacent the sidewall which defines the outlet flow passage. The fin members may have various possible configurations, but in a simplified construction are each provided as an axially elongated rib. Most preferably, two or more fins are positioned in the outlet passage, with each fin being positioned with a radial spacing from each other along the outlet passage sidewall of between about 45° and 135°, and more preferably where two fins are present about 120°. The fin members preferably extend at least one-half the axial length, and more preferably at least three-quarters the axial length of the outlet flow passage.

The inlet flow passage preferably is provided with an enlarged diameter cylindrical section and a reduced diameter cylindrical section which is provided in a co-axially aligned orientation, and with the reduced diameter section positioned between the enlarged diameter section and the valve seat. A frustoconically shaped section may furthermore be provided as a transition section between the enlarged and reduced diameter sections. The frustoconical section is characterized by a sidewall which tapers inwardly at an angle inwardly towards the axis in a downstream flow direction towards the outlet flow passage, at an angle of between about 30° and 60°, and more preferably between about 40° and 50°. The enlarged and reduced diameter cylindrical sections are preferably formed with respective radial diameters chosen so that the reduced diameter portion has a diameter which is between about 50 and 70% of the diameter of the enlarged diameter portion. Differing sized diameter ratios between the enlarged and reduced diameter cylindrical sections are, however, also possible.

A pressure measuring probe is provided respectively in communication with each of the enlarged cylindrical diameter section and the reduced diameter section of the inlet flow passage. The probes are selected to permit a measurement of the fluid pressure in the respective cylindrical section, as fluid flows through the valve body. The applicant has appreciated that the measurement of the fluid pressure in each of the cylindrical sections by the probes enables the calculation of fluid flow thereacross. More particularly, fluid flow may be calculated as being proportional to the square root of the difference in pressure measured between the enlarged diameter cylindrical section and the reduced diameter cylindrical section.

In a simplified construction, the probes each consist of a mechanical or electronic pressure gauge. In such a construction, bores are formed through the sidewall of the valve body opening into each of the enlarged cylindrical section and the narrower reduced cylindrical section. The pressure gauges are secured over each respective bore, and in fluid communication with the respective cylindrical sections to permit a comparative fluid pressure reading thereof. It is to be appreciated, however, that other different types of probes may also be used.

Accordingly, in one aspect the present invention resides in a balancing valve for use in fluid circulation and supply systems comprising, a valve body having an axially extending fluid passage therethrough, the fluid passage including a fluid inlet passage defined by a first sidewall portion and a fluid outlet passage defined by a second sidewall portion, the fluid inlet portion including an enlarged cylindrical portion having a first diameter, and a reduced cylindrical portion having a second diameter selected smaller than the first diameter, a first measuring device for measuring fluid pressure in said enlarged cylindrical portion and a second measuring device for measuring fluid pressure in said reduced cylindrical portion, at least one fin member disposed in said outlet passage, each of the fin members projecting inwardly into said fluid outlet passage from spaced locations along said second sidewall portion, a valve seat intermediate said fluid inlet and fluid outlet passages and wherein the reduced cylindrical portion is disposed intermediate said enlarged cylindrical portion and said valve seat, and a sealing member being selectively movable towards and away from said valve seat to regulate fluid flow from said fluid inlet passage to said fluid outlet passage.

In another aspect, the present invention resides in a fluid circuit balancing valve comprising a valve body defining a fluid flow inlet passage and a fluid flow outlet passage, the fluid flow outlet passage extending along an axis, a pair of fin members being disposed in said outlet passage, the fin members projecting partway towards said axis from radially spaced locations along said body, a valve seat intermediate said inlet and outlet passages, a sealing member being selectively movable towards and away from said valve seat to prevent or permit fluid flow from said inlet passage to said outlet passage.

In a further aspect, the present invention resides in valve for balancing fluid flow in a fluid flow system, the valve comprising, a valve body having an axially extending fluid passage therethrough, the fluid passage including a fluid inlet passage defined by a first sidewall portion and a fluid outlet passage defined by a second sidewall portion, each of the first and second sidewall portions extending radially about the axis, the fluid inlet portion including an enlarged cylindrical portion having a first diameter, and a reduced cylindrical portion having a second diameter selected smaller than the first diameter, a first bore extending through said body and open to said enlarged cylindrical portion, and a second bore extending through said body and open to said reduced cylindrical portion, a first pressure valve fluidically coupled to said first bore, and a second pressure valve fluidically coupled to the second bore, a pair of axially elongated fin members disposed in said outlet passage, the fin members extending partway towards said axis from locations spaced radially between about 45° and 135° apart along said second sidewall portion, a valve seat intermediate said fluid inlet and fluid outlet passages and wherein the reduced cylindrical portion is disposed intermediate said enlarged cylindrical portion and said valve seat, and a sealing member being selectively movable towards and away from said valve seat to regulate fluid flow from said fluid inlet passage to said fluid outlet passage.

BRIEF DESCRIPTION OF THE DRAWINGS

Reference may now be had to the following detailed description taken together with the accompanying drawings in which.

DETAILED DESCRIPTION OF THE PREFERRED EMBODIMENTS

Figure 1:
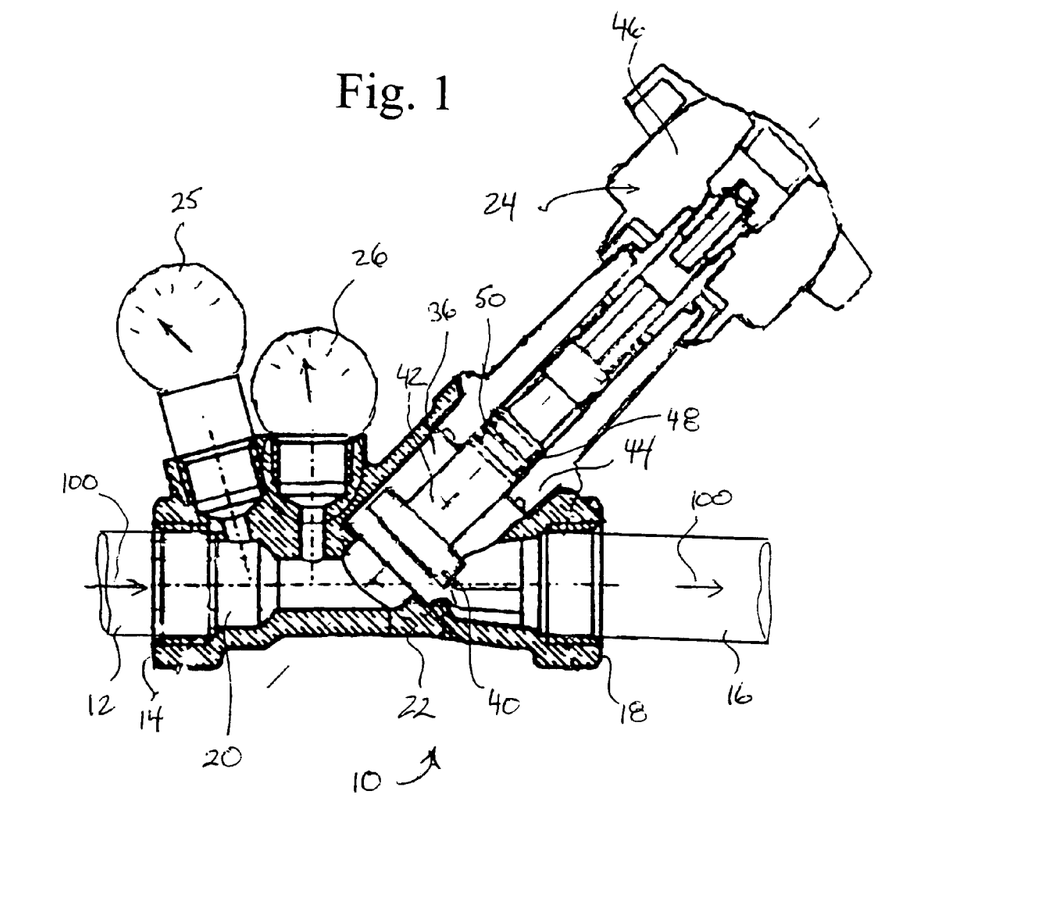
FIG. 1 illustrates schematically a sectional view of a circuit balancing valve in accordance with a preferred embodiment of the invention.

Reference may be had to FIG. 1 which illustrates a circuit balancing valve 10 (CBV) for use in a one-half inch water circulation system. The valve 10 shown in FIG. 1 is provided in-line in the circulation system, wherein a 0.5 inch water supply pipe 12 is in fluid communication with an inlet side 14 of the valve, and a water outlet pipe 16 is in fluid communication with an outlet side 18 of the valve 10. The supply pipe 12 provides a pressurized water flow in the direction of arrows 100 through a fluid flow passage 20 which extends through the valve body 22 from the inlet side 14 to the outlet side 18, and into the outlet supply pipe 18. As will be described, the operation of the balancing valve 10 permits adjustment in the flow rate volume of water flowing from the supply pipe 12 into the outlet pipe 18, allowing the adjustment of water pressure and/or flow in the circulation system.

The valve body 22 may, for example, be formed from a cast brass or other metal. In addition to the valve body 22, the valve includes a flow adjusting mechanism 24 which, as will be described, is used to regulate fluid flow through the valve body 22 and a pair of mechanical pressure gauges 25,26. The pressure gauges 25,26 are mounted to the valve body 12, and as will be described, are each provided in fluid communication with the fluid flow passage 20.

Figure 2:
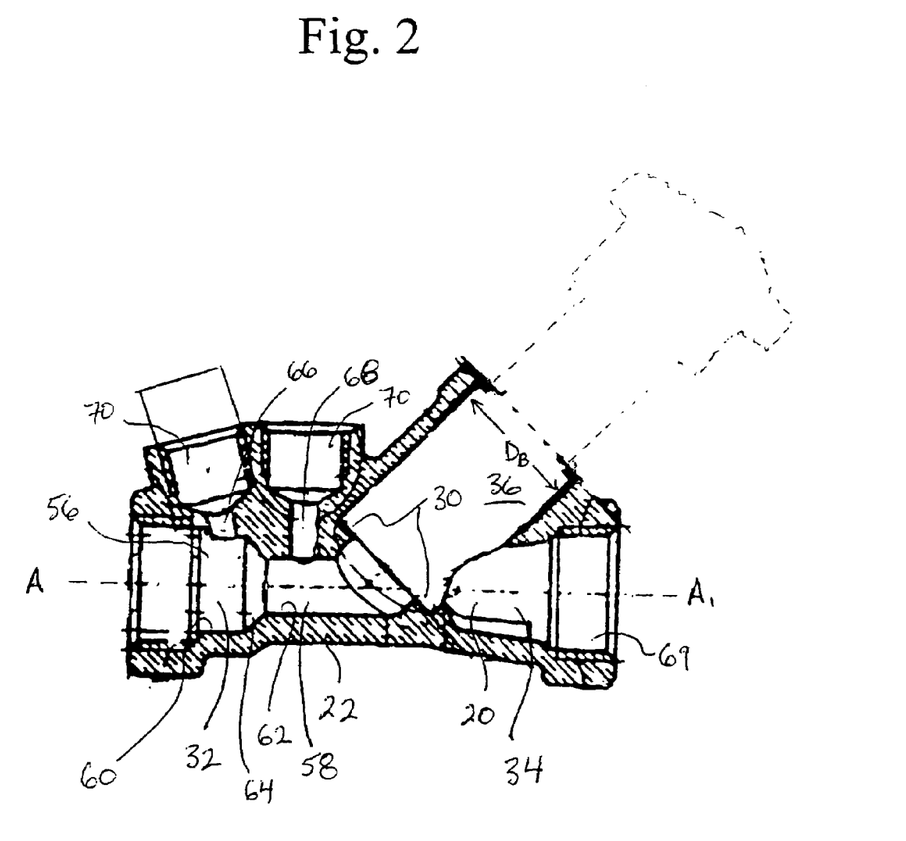
FIG. 2 illustrates schematically the body of the circuit balancing valve shown in FIG. 1.
Figure 6:
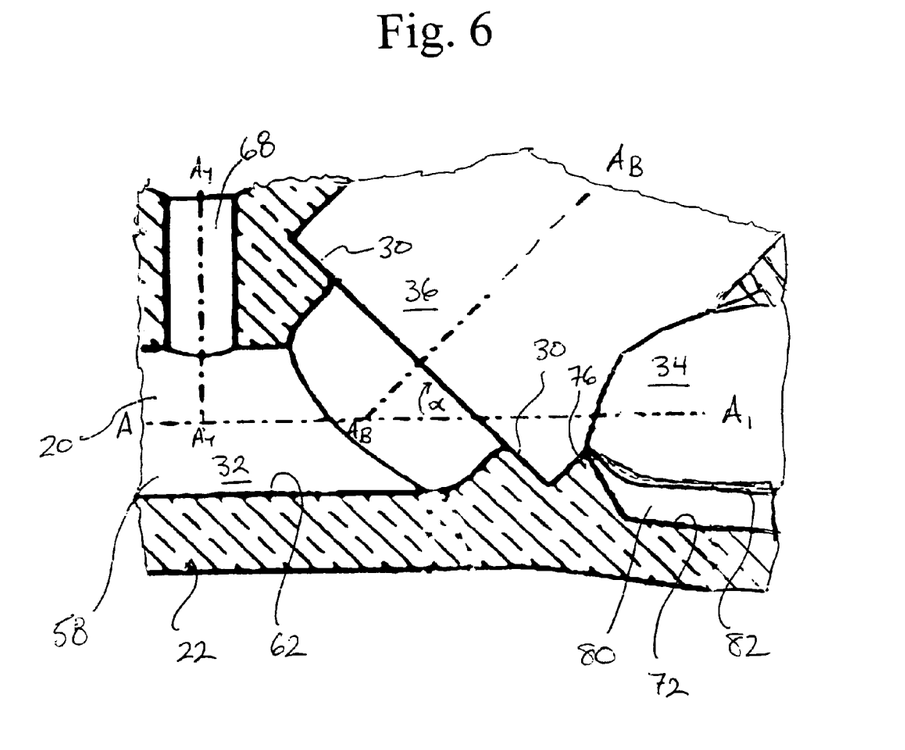
FIG. 6 illustrates an enlarged partial cross-sectional view of the valve seat formed in the valve body shown in FIG. 2.

The valve body 22 is shown in detail best in FIGS. 1 and 2 with the fluid flow passage 20 extending in an axial direction along axis A-A$_1$ and providing fluid communication between the water supply pipe 12 and the outlet pipe 18. An annular valve seat 30 is provided at a mid-portion of the body 22 and divides the fluid flow passage 20 into an upstream inlet flow passage 32 and a downstream outlet flow passage 34. As shown best in FIGS. 2 and 6, the valve seat 30 is provided as an annular extending shoulder which extends about the flow passage 20. The valve seat 30 is oriented in a plain which is inclined in a generally upstream orientation at an angle α of between about 30° and 60°, and more preferably about 45° relative to the axis A-A$_1$. The valve seat 30 defines the innermost extent of a cylindrical actuator bore 36 which extends through an uppermost side surface of the valve body 22, which opens partially into the fluid flow passage 20. The actuator bore 36 is elongated along and concentric about a bore axis A$_B$-A$_B$ (FIG. 6) which extends in a direction generally normal to the planar orientation of the valve seat 30.

The actuator bore 36 has a radial diameter D$_B$ (FIG. 2) which is selected to permit the partial insertion of the flow adjusting mechanism 24 therein in the manner shown in FIG. 1. The flow adjusting mechanism 24 is shown in FIG. 1 as including an elastomeric disk-shaped sealing member 40, a valve stem 42, a threaded coupling collar 44 and a handle 46. The sealing member 40 has a size adapted for complementary mated engagement with the valve seat 30. As such, engaging contact between the sealing member 40 and valve seat 30 prevents the flow of water from the inlet flow passage 32 into the outlet flow passage 34. The sealing member 40 is secured to a distalmost end of the valve stem 42. The valve stem 42 is in turn mounted by means of the coupling collar 44 for selective reciprocal movement axially along the actuator bore 36. Preferably, the collar 44 is provided with internal threads 48 which are configured for engagement with external threads 50 on the valve stem 42. The collar 44 may be furthermore threadedly coupled or otherwise soldered to the valve body 22 partially disposed within the actuator bore 36. Threaded coupling of the collar 44 to the valve body 22, however, advantageously releasably secures the valve stem 42 removably within the actuator bore 36 allowing replacement of the sealing member 40.

The handle 46 is fixedly coupled to the upper proximal end of the valve stem 42. The rotation of the handle 46 permits manual adjustment of fluid flow through the valve 10. The rotation of the handle 46 rotates the valve stem 42, whereby the engagement between the threads 48 on the collar 44 and the threads 50 as the stem 42 rotates the distal end of the valve stem 42 along the axis A$_B$-A$_B$. The rotation of the handle 46 is thus used to selectively advance or retract the sealing member 40 and distal end of the valve stem 42 either towards or away from sealing contact with the valve seat 36, so as to restrict or permit water flow between the inlet flow portion 32 and outlet flow portion 34 of the fluid flow passage 20.

Figure 3:
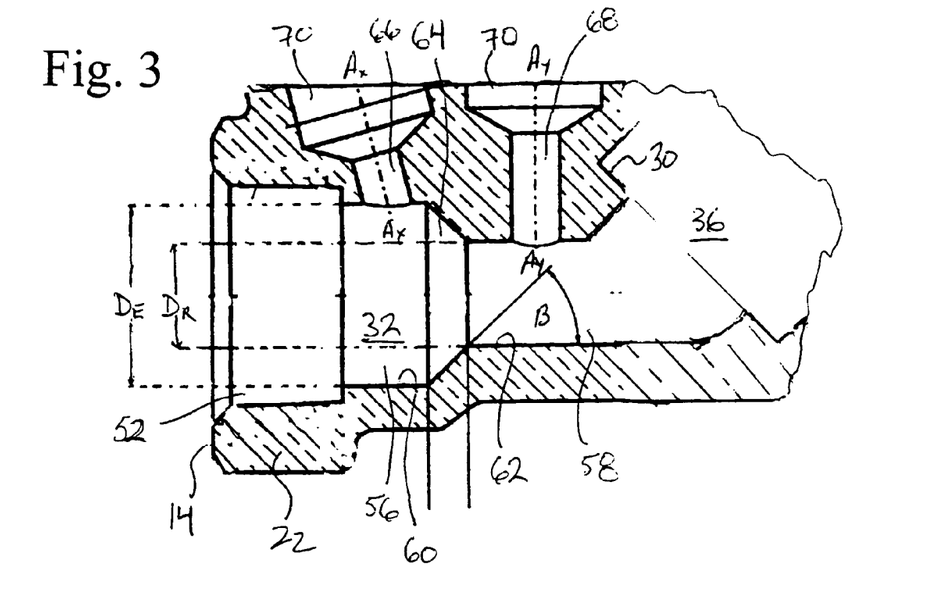
FIG. 3 illustrates an enlarged partial cross-sectional view of the fluid inlet end portion of the valve body shown in FIG. 2.

FIGS. 2 and 3 illustrate the inlet flow passage 32 of the valve 10 as extending from the inlet side 14 to the valve seat 30. The portion of the inlet flow passage 32 immediately adjacent to the inlet side 14 is shown as being formed as an axially extending cylindrical socket 52. The socket has a size selected to receive therein in a complementary fit the endmost portion of the water supply pipe 12 (FIG. 1) for soldered coupling to the valve body 22. It is to be appreciated, however, that other types of pipe couplings including pressure fittings and threaded couplings could also be used without departing from the present invention. The inlet flow passage 32 is further characterized by an enlarged diameter cylindrical portion 56 and a reduced diameter cylindrical portion 58, each of which is defined by a respective sidewall 60,62 which extends radially about the axis A-A$_1$. The sidewall 62 of the reduced diameter portion 58 extends radially about the axis A-A$_1$ concentrically with the sidewall 60.

Although not essential, most preferably the enlarged diameter portion 56 has a radial diameter D$_E$ (FIG. 3) which is approximately equal to the internal diameter of the water supply pipe 12. With this configuration when the pipe 12 is secured to the valve body 22, water flowing from the pipe 12 into the enlarged diameter portion 56 is subjected to minimum resistance and/or venturi. The reduced diameter cylindrical portion 58 is characterized by a diameter D$_R$ which is selected preferably at between about 50 and 70% diameter D$_E$ (FIG. 3) of the enlarged diameter portion 56.

A frustoconically shaped transition section 64 provides a transition of between the enlarged diameter portion 56 and the reduced diameter portion 58. The frustoconical section 64 is characterized by a sidewall which tapers inwardly towards the axis A-A$_1$ in the downstream direction of water flow 100, at an angle β (FIG. 3) of between about 40 and 70°, and more preferably at about 45°.

FIGS. 2 and 3 further show best a pair of cylindrical bores 66,68 formed through the top of the valve body 22 and which open into the cylindrical portions 56,58 respectively. Although not essential, most preferably the bores 66,68 extend along and are centred about a respective bore axis A$_X$-A$_X$ and A$_Y$-A$_Y$ (FIG. 3) which are co-planar with each other, the axis A-A$_1$ and the actuator bore axis A$_B$-A$_B$. In a simplified construction, the bores 66,68 have essentially the same bore diameter and are each provided with a flared end 70 which is shaped for mated coupling with a respective pressure gauge 25,26. As is apparent, the bore 56 provides pressurized fluid communication between the enlarged cylindrical portion 56 and pressure gauge 25, with the bore 68 providing pressurized fluid communication between the reduced diameter portion 58 and the pressure gauge 26.

FIGS. 1 and 3 illustrate the axis A$_X$-A$_X$ of bore 66 as extending in an inclined orientation relative to axis A$_Y$-A$_Y$. This orientation advantageously permits the mounting of the pressure gauge 25,26 in a generally co-planar relationship with each other and with the handle 46 along the top surface of the valve body 22. This construction advantageously provides the valve 10 with a physically compact construction, enabling its use in areas where valve size may be critical. It is to be appreciated that where either larger valves 10 or smaller pressure gauges are to be used, the bores 66,68 may possibly be provided with differing relative orientations.

The bores 66,68 and pressure gauges 25,26 advantageously permit the accurate determination of pressure differences between the cylindrical sections 56,58. In particular, the gauges 25,26 enable the calculation of the fluid pressure drop as fluid flows from the enlarged diameter cylindrical section 56 into the reduced diameter cylindrical section 58. The pressure drop can be used to measure total fluid flow as being proportional to the square root of the difference in pressure measure between the cylindrical sections 56,58 both before and after the frustoconical transition section 64.

Figure 4:
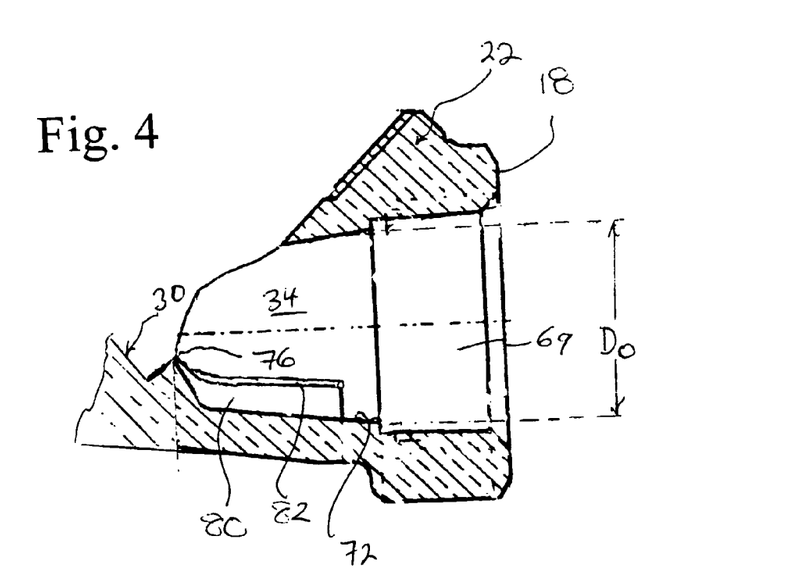
FIG. 4 illustrates an enlarged partial cross-sectional view of the fluid outlet end portion of the valve body shown in FIG. 2.
Figure 5:
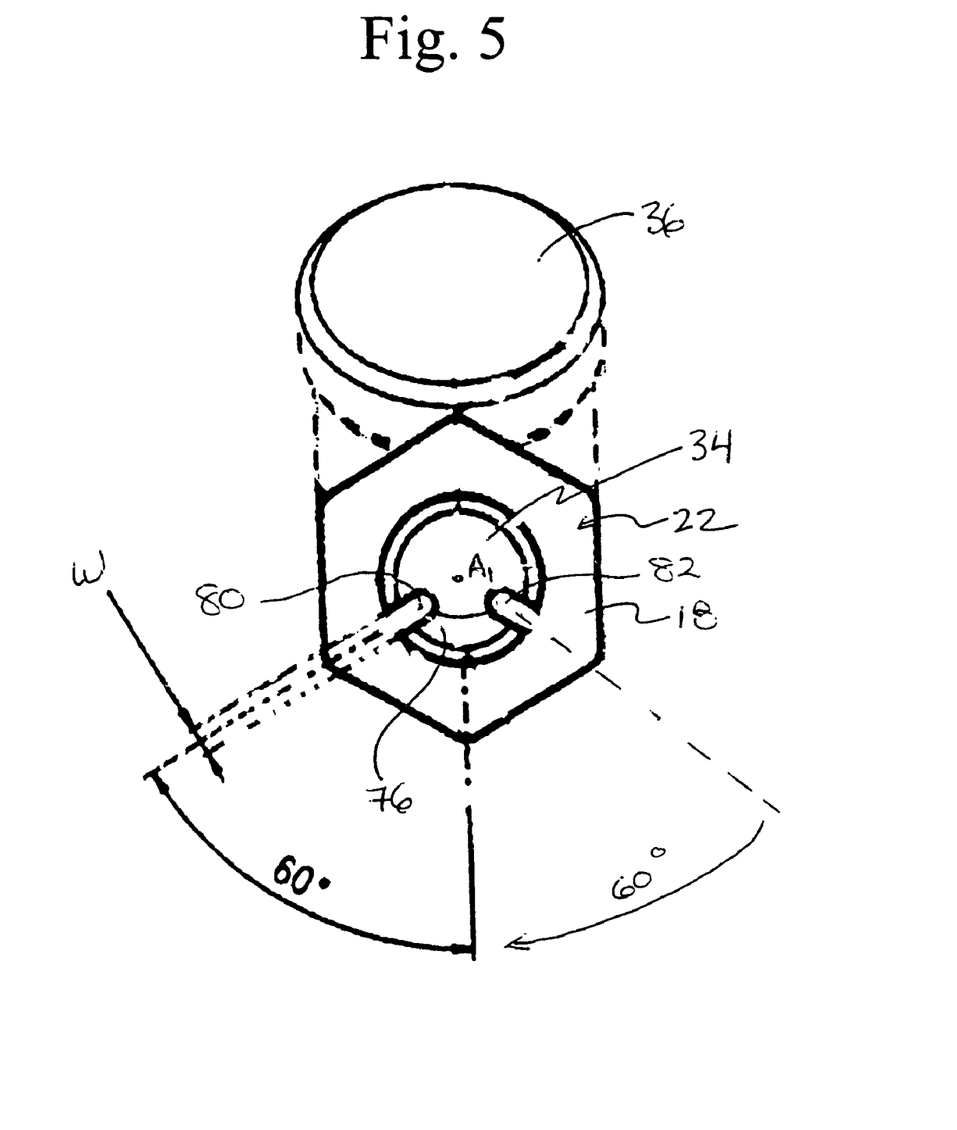
FIG. 5 illustrates a perspective end view of the outlet end portion of the valve body illustrated in FIG. 4.

FIGS. 2, 4 and 5 illustrate best the outlet flow passage 34 through the valve body 22. The valve body further includes an enlarged cylindrical outlet pipe socket 69 which has a diameter selected marginally greater than the diameter of the outlet pipe 18. The socket 69 shape and diameter is selected to enable the fitted placement of the water outlet pipe 18 therein where it may thereafter be secured to the valve body 22 by soldering or by the use of pressure fittings. The outlet flow passage is substantially defined by a sidewall 72 extending generally radially about the axis A-A$_1$. Most preferably, the outlet flow passage has a diameter D$_O$ (FIG. 4) which is approximately equal to the diameter D$_E$ of the enlarged cylindrical portion 56. The diameter D$_O$ is furthermore preferably approximately equal to the internal diameter of the water outlet pipe 16 to minimize water flow resistance and venturi as water moves from the outlet flow passage 34 into the outlet pipe 16. In the embodiment shown in FIG. 6, the upstreammost end of the outlet flow passage 34 includes a partially annularly extending boss 76 which projects radially inwardly into the flow passage 20 and which as is apparent, forms a lateral extent of a shoulder for the annular valve seat 30. As shown best in FIGS. 4 and 5, a pair of axially extending fins 80,82 project radially inwardly towards the axis A-A$_1$ from the lowermost portion of the sidewall 72. The fins 80,82 have an axial length selected at approximately three-quarters the axial length of the flow passage, and most preferably extend radially from the sidewall 72 about halfway to the axis A-A$_1$. It is to be appreciated that longer or shorter fins are, however, possible. FIG. 5 illustrates best the spacing of the fins 80,82 from locations spaced radially from each other along the sidewall 72. Most preferably, the fins 80,82 are spaced radially apart between about 40° and 140°, and more preferably about 120° from each other.

Where the valve 10 is used in 0.5 inch water circulation systems, the fins 80,82 are preferably formed as elongated members having a cross-sectional width W selected at between about 0.1 inch and have a radial elongation of between about 0.15 and 0.2 inches. Larger or smaller fins are, however, possible, depending upon the size of valve supply lines, flow volumes and the overall valve size.

The configuration of the present invention facilitates simplified manufacturing of the valve body 22. In particular, the frustoconical transition section 64 and co-axially aligned enlarged cylindrical section 56 and reduced diameter section 58 enable the inlet flow passage 32 to be formed by machining in a single or two-step machining process. The machining thus provides the accurate formation of inflow passage 32 in which the cylindrical sections 56,58 and transition section 64 are provided with highly accurately machined diameters DEDR and smooth sidewall surfaces 60,62 ensuring increased accuracy in pressure readings therefrom.

It is to be appreciated that the fins 80,82 advantageously assist in maintaining a laminar flow within the valve body 22. The axial orientation of the fins 80,82 assists in redirecting any eddy or circular fluid flow in the direction of arrows 100 (FIG. 1) as the fluid moves across the valve seat 30. The applicant has appreciated that the elimination of eddy flows within the valve 10 assists in providing more accurate pressure readings across the enlarged and reduced diameter cylindrical sections 56,58 thereby providing increased accuracy in pressure readings.

Figure 7:
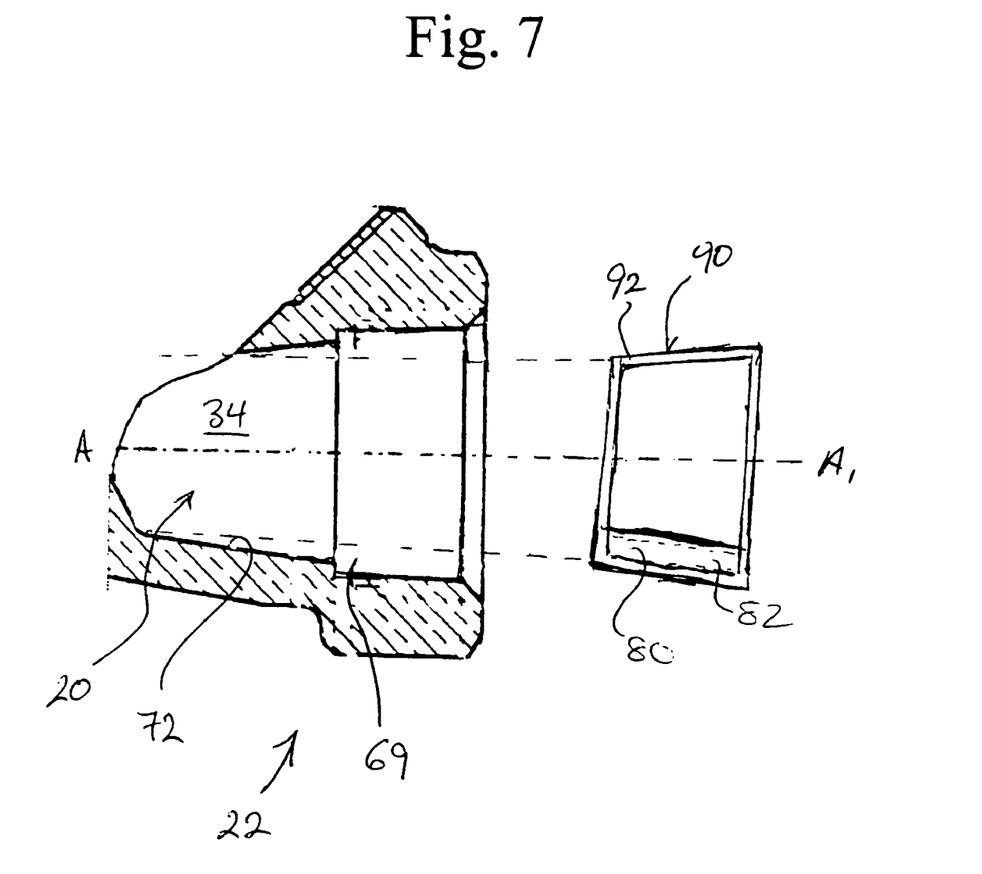
FIG. 7 shows an enlarged exploded partial cross-sectional view of the outlet end portion of the valve body in accordance with a further embodiment of the invention.

In a most preferred embodiment, the valve body 22 and fins 80,82 are forged as a single integral unit. The forging of the fins 80,82 as part of the valve body minimizes costs. An alternate possible construction is, however, shown in FIG. 7 which illustrates a fluid outlet end portion for the valve body 22 in accordance with an alternate embodiment of the invention wherein like reference numerals are used to identify like components. In FIG. 7, for example, the valve body 22 is to be formed of stainless steel. The fins 80,82 could be provided as part of a stainless steel sleeve insert 90. The stainless steel sleeve insert 90 is provided as an open stainless steel lattice or cage 92 which is provided with a complementary size for insertion within the outlet end portion 34 in juxtaposed contact with the sidewall 72. The lattice 92 is formed so as to permit substantially unobstructed fluid flow along the axis A-A$_1$ in the flow direction 100 shown in FIG. 1. In this regard, the lattice 92 may be provided with an open framework, however, alternate possible constructions are possible.

The fins 80,82 are secured within the lattice 92 in substantially the same orientation as for example is illustrated in FIG. 5. The sleeve insert 90 may be secured in place within the outlet end portion 34 of the fluid flow passage 20 either by mechanical crimping or soldering, or by the securement of the outlet pipe 16 within the socket 69. The sleeve insert 90 of FIG. 7 is adapted for sliding axial insertion within the open end of the outlet portion 34.

Although the preferred embodiment of the invention describes a balancing valve 10 for use in half-inch water circulation systems, the invention is not so limited. It is to be appreciated that the valve could equally be used with other types of fluid flow circulation or supply systems where larger or smaller diameter infeed supply and outlet supply pipes are to be used.

While preferable that the bores 66,68 to which the pressure gauges 25,26 are secured extend in a co-planar relationship with the actuator bore 36 and axis A-A$_1$, the invention is not so limited. The applicant has appreciated, however, that such a design advantageously allows the balancing valve 10 to be installed in smaller areas where valve size may be critical. As such, the preferred design presents a more compact valve construction than one where, for example, gauges and handle portions extend from the valve body in differing planes.

Although the preferred embodiment illustrates the circuit balancing valve 10 as including a handle 46 for manually adjusting fluid flow, the invention is not so limited. It is to be appreciated that in an alternate construction, the valve stem 42 may be actuated by means of an electric, pneumatic or hydraulic drive either to move the sealing member 40 either towards or away from the valve seat 30 depending upon the desired fluid flow.

Similarly, while the preferred embodiment of the invention illustrates the balancing valve 10 as including a pair of mechanical pressure gauges 25,26 secured over a respective bore 66,68 and provided in fluid communication with the respective enlarged and reduced diameter cylindrical sections 56,58 as being used to calculate fluid pressures, the invention is not so limited. Other types of pressure probes, including without restriction electronic probes or the like, could be used to calculate fluid pressures within the cylindrical sections 56,58 of the inlet flow passage 32 and which will now become readily apparent.

Figure 8:
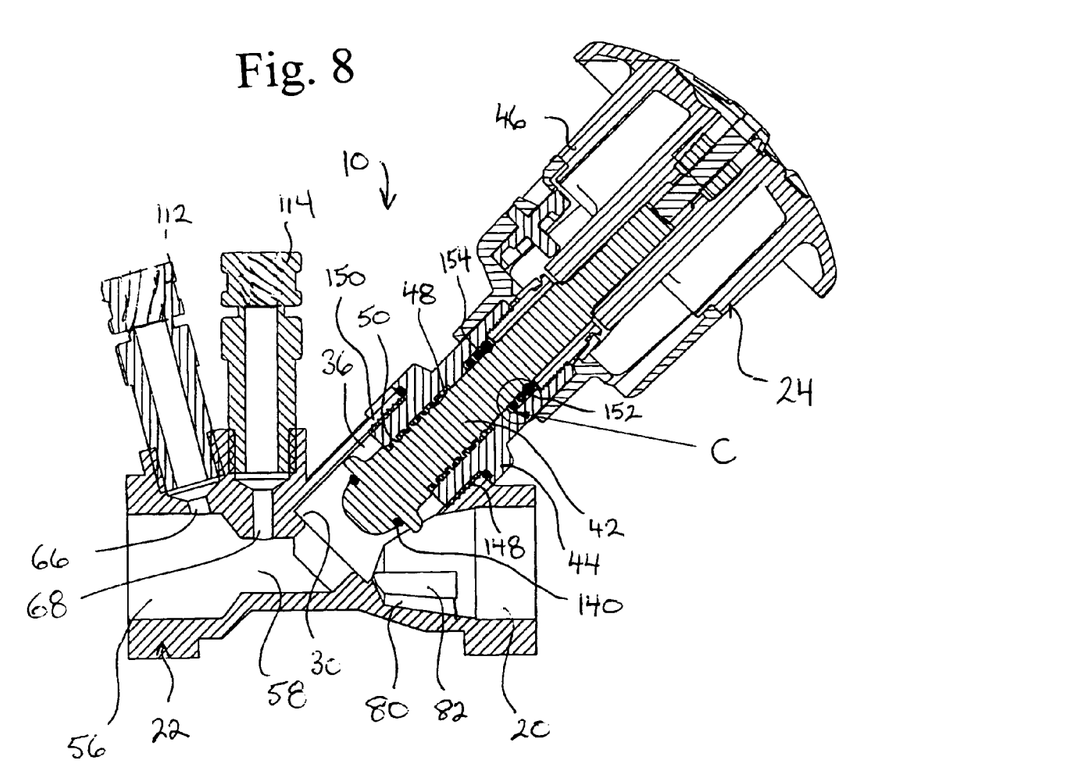
FIG. 8 shows a schematic cross-sectional view of a circuit balancing valve incorporating a handle assembly in accordance with a further preferred embodiment of the invention.

Reference is made to FIG. 8 which illustrates a circuit balancing valve 10 which incorporates a flow adjusting mechanism 24 in accordance with a further preferred embodiment and in which like reference numerals are used to identify like components. FIG. 8 shows the CBV 10 as including electronic probes 112,114 as being secured over the bores 66,68, respectively, and in fluid communication with the cylindrical sections 56,58, respectively.

Figure 9:
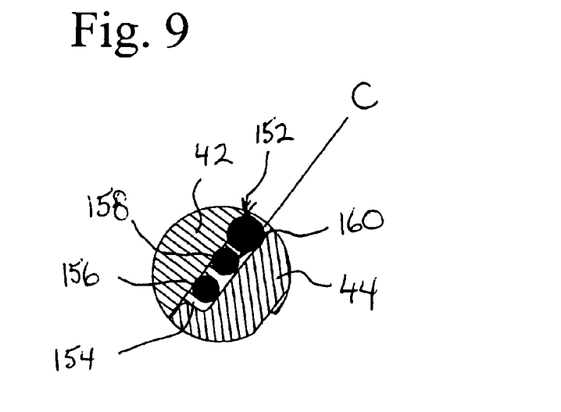
FIG. 9 illustrates an enlarged schematic view of detail C shown in FIG. 8.

FIGS. 8 and 9 further show the valve stem 42 as including an elastomeric O-ring member 140 in place of the sealing member shown in FIG. 1. Like the sealing member 40, the O-ring member 140 is mounted to an innermost end of the valve stem 42 and has the size adapted for complementary mated engagement against the valve seat 30 to prevent fluid flow along the fluid passage 20.

FIG. 8 further shows the mechanism 24 as including a hollow coupling collar 44 having an externally threaded lower portion 148. The threaded lower portion 148 has a diameter corresponding to the radial diameter $D_B$ (FIG. 2) of the actuator bore 36, and is further configured for complementary threaded engagement with an internally threaded portion 150 formed about the distalmost portion of the bore 36. As with the embodiment shown in FIG. 1, the valve stem 42 is movable axially along the actuator bore 36 by the threaded engagement between valve stem threads 50 and internal threads 48 provided on the collar 44 by manually rotating a handle 46 which is secured to the end of the valve stem 42.

As shown best in enlarged section C in FIG. 9, the valve stem 42 and collar 44 are preferably maintained in a fluid-tight arrangement whereby fluid movement is prevented therebetween by means of a packed O-ring assembly 152 (FIG. 8). The O-ring assembly is positioned in an annular groove 154 formed along an interior surface of the collar 44 about the valve stem 42. As shown best in FIG. 9, the O-ring assembly 152 preferably consists of three O-rings 156,158, 160. The O-rings 156,158 spaced closest to the valve seat 30 have a cross-sectional diameter selected to engage both the exterior peripheral surface of the valve stem 42 and the side of the collar 44 which defines the groove 154. As shown best in FIG. 9, most preferably, the third O-ring 160 which is remote from the valve seat is formed with a larger cross-sectional diameter than each of the O-rings 156,158 as a further sealing member. The O-rings 156,158,160 are provided at spaced locations along the axis $A_B$-$A_B$ (FIG. 6) within the groove 158. The applicant has appreciated that the O-ring construction advantageously permits rotation and axial movement of the valve stem 42 relative to the collar 44, while providing enhanced sealing therebetween under increased fluid pressures within the fluid flow passage 20.

Although the preferred embodiment illustrates the valve body 22 as incorporating a pair of radially spaced fins 80,82, the invention is not so limited. It is to be appreciated that the valve body 22 could be provided with either a single fin or three or more fins, depending upon the diameter of the outlet flow passage.

Although the detailed description describes and illustrates various preferred embodiments, the invention is not so limited. Many modifications and variations will now occur to persons skilled in the art. For a definition of the invention, reference may be made to the amended claims.

I claim:

1. A balancing valve for use in fluid circulation and supply systems comprising,
    a valve body having an axially extending fluid passage therethrough, the fluid passage including a fluid inlet passage defined by a first sidewall portion and a fluid outlet passage defined by a second sidewall portion, the fluid inlet portion including an enlarged cylindrical portion having a first diameter, and a reduced cylindrical portion having a second diameter selected smaller than the first diameter,
    a first measuring device for measuring fluid pressure in said enlarged cylindrical portion and
    a second measuring device for measuring fluid pressure in said reduced cylindrical portion,
    at least one fin member disposed in said outlet passage, each of the un members projecting inwardly into said fluid outlet passage from spaced locations along said second sidewall portion,
    a valve seat intermediate said fluid inlet and fluid outlet passages and wherein the reduced cylindrical portion is disposed intermediate said enlarged cylindrical portion and said valve seat, and
    a sealing member being selectively movable towards and away from said valve seat to regulate fluid flow from said fluid inlet passage to said fluid outlet passage.

2. The balancing valve of claim 1 wherein the second sidewall portion extends radially about the axis, the fin members being axially elongated and extend from said second sidewall portion at radially spaced locations partway towards said axis.

3. The balancing valve of claim 2 comprising a pair of fin members, wherein the fin members are spaced radially between about 40 and 140° apart along said second sidewall portion from each other.

4. The balancing valve of claim 3 wherein said fin members extend substantially the axial length of said fluid outlet portion.

5. The balancing valve of claim 4 wherein said valve seat comprises an annular shoulder extending radially about said axis inclined in a plane, said plane being oriented at an angle of between 30° and 60° relative to said axis,
    said balancing valve further including an actuator bore extending partially through said valve body to said valve seat in an orientation generally normal to said plane,
    a valve stem having a proximal end and a distal end being movably disposed in said actuator bore, said sealing member being coupled to said proximal end of the valve stem, and
    a handle member secured to the distal end of the valve stem whereby manual movement of the handle selectively moves said valve stem relative to said actuator bore to selectively urge said sealing member towards or away from said valve seat to permit or restrict fluid flow along the fluid passage.

6. The balancing valve of claim 5 wherein said plane is inclined at an orientation of about 45° relative to said axis.

7. The balancing valve of claim 1 wherein said valve further comprises a first bore extending through said body and open to said enlarged cylindrical portion, the first bore extending along a first bore axis and a second bore extending through said body and open to said reduced cylindrical portion, the second bore extending along a second bore axis,
    each of the first bore axis, the second bore axis and the fluid passage axis being substantially co-planar,
    the first measuring device comprising a first pressure valve fluidically coupled to said first bore, and the second measuring device comprising a second pressure valve fluidically coupled to the second bore.

8. The balancing valve of claim 5 wherein said valve further comprises a first bore extending through said body and open to said enlarged cylindrical portion, and a second bore extending through said body and open to said reduced cylindrical portion,
    the first measuring device comprising a first pressure valve fluidically coupled to said first bore, and the second measuring device comprising a second pressure valve fluidically coupled to the second bore.

9. The balancing valve of claim 7 wherein said body and said fin members are forged as a simple unit.

10. The balancing valve of claim 5 wherein said first sidewall portion further includes a frustoconical section providing a transition between said enlarged cylindrical portion and said reduced cylindrical portion, said frustoconical section being inclined at an angle of 40 to 50° relative to said axis.

11. The balancing valve of claim 10 wherein said second diameter has a size selected at between about 50 and 70% of said first diameter.

12. The balancing valve of claim 1 wherein each of said fin members comprise part of an insert adapted for fitted axial placement in said fluid outlet passage.

13. A fluid circuit balancing valve comprising
a valve body defining a fluid flow inlet passage and a fluid flow outlet passage,
the fluid flow outlet passage extending along an axis,
a pair of fin members being disposed in said outlet passage, the fin members projecting partway towards said axis from radially spaced locations along said body,
a valve seat intermediate said inlet and outlet passages,
a sealing member being selectively movable towards and away from said valve seat to prevent or permit fluid flow from said inlet passage to said outlet passage, and wherein the fluid flow inlet passage is axially aligned with the fluid flow outlet passage, the fluid flow inlet passage further including an enlarged cylindrical portion having a first diameter, and a reduced cylindrical portion having a second diameter selected smaller than the first diameter, the enlarged and reduced cylindrical portions being axially aligned and concentric about the axis with the reduced cylindrical portion being disposed intermediate said enlarged cylindrical portion and said valve seat,
a first measuring device for measuring fluid pressure in said enlarged cylindrical portion, and
a second measuring device for measuring fluid pressure m reduced cylindrical portion.

14. The balancing valve as claimed in claim 13 further comprising a first bore extending through said valve body and open to said enlarged cylindrical portion, and a second bore extending through said valve body and open to said reduced cylindrical portion,
the first measuring device comprising a first pressure valve fluidically coupled to said first bore, and
the second measuring device comprising a second pressure valve fluidically coupled to the second bore.

15. The balancing valve as claimed in claim 14 wherein said fluid flow inlet passage further includes a frustoconical section providing a transition between said enlarged cylindrical portion and said reduced cylindrical portion, said frustoconical section being characterized by a sidewall inclined at an angle of 40 to 50° relative to said axis.

16. The balancing valve of claim 15 wherein said second diameter has a size selected at between 50 and 70° of said first diameter.

17. A valve for balancing fluid flow in a fluid flow system, the valve comprising,
a valve body having an axially extending fluid passage therethrough, the fluid passage including a fluid inlet passage defined by a first sidewall portion and a fluid outlet passage defined by a second sidewall portion, each of the first and second sidewall portions extending radially about the axis,
the fluid inlet portion including an enlarged cylindrical portion having a first diameter, and a reduced cylindrical portion having a second diameter selected smaller than the first diameter,
a first bore extending through said body and open to said enlarged cylindrical portion, and a second bore extending through said body and open to said reduced cylindrical portion,
a first pressure valve fluidically coupled to said first bore, and a second pressure valve fluidically coupled to the second bore,
a pair of axially elongated fin members disposed in said outlet passage, the fin members extending partway towards said axis from locations spaced radially between about 45° and 135° apart along said second sidewall portion,
a valve seat intermediate said fluid inlet and fluid outlet passages and wherein the reduced cylindrical portion is disposed intermediate said enlarged cylindrical portion and said valve seat, and
a sealing member being selectively movable towards and away from said valve seat to regulate fluid flow from said fluid inlet passage to said fluid outlet passage.

18. The balancing valve of claim 17 wherein said second diameter has a size selected at between about 50 and 70% of said first diameter, and said first sidewall portion further includes a frustoconical section providing a transition between said enlarged cylindrical portion and said reduced cylindrical portion, said frustoconical section being inclined at an angle of 35° to 55° relative to said axis.

19. The valve as claimed in claim 18 wherein said valve seat comprises an annular shoulder extending about said axis, said shoulder being inclined at an angle of between 30° and 60° relative to said axis,
said balancing valve further including an actuator bore extending open to said valve seat,
a valve stem having a proximal end and a distal end being movably disposed in said actuator bore, said sealing member being coupled to said proximal end of the valve stem for movement therewith, and
a handle member secured to the distal end of the valve stem whereby manual movement of the handle selectively moves said valve stem relative to said actuator bore to selectively urge said sealing member towards or away from said valve seat to permit or restrict fluid flow along the fluid passage.

20. The valve as claimed in claim 19 further comprising,
a collar movably retaining said valve Stem in said actuator bore, and
a sealing assembly providing a substantially fluid-tight seal between said collar and said valve stem, said sealing assembly comprising a plurality of axially disposed sealing members sized to rotatably engage at least one of an exterior portion of said valve stem and an interior portion of said collar.

21. The valve as claimed in claim 20 wherein said axially disposed sealing members are resiliently compressible O-rings, at least one of said O-rings having a cross-sectional diameter which is larger than a cross-sectional diameter of another.

22. The valve as claimed in claim 21 wherein said sealing assembly comprises three axially disposed O-rings.

23. The valve as claimed in claim 22 wherein the O-ring having the larger cross-sectional diameter is positioned remote from said valve seat.

* * * * *